No. 695,126. Patented Mar. 11, 1902.
J. SWINBURNE & E. A. ASHCROFT.
PROCESS OF EXTRACTING METALS FROM SULFID ORES.
(Application filed Dec. 8, 1899.)
(No Model.)
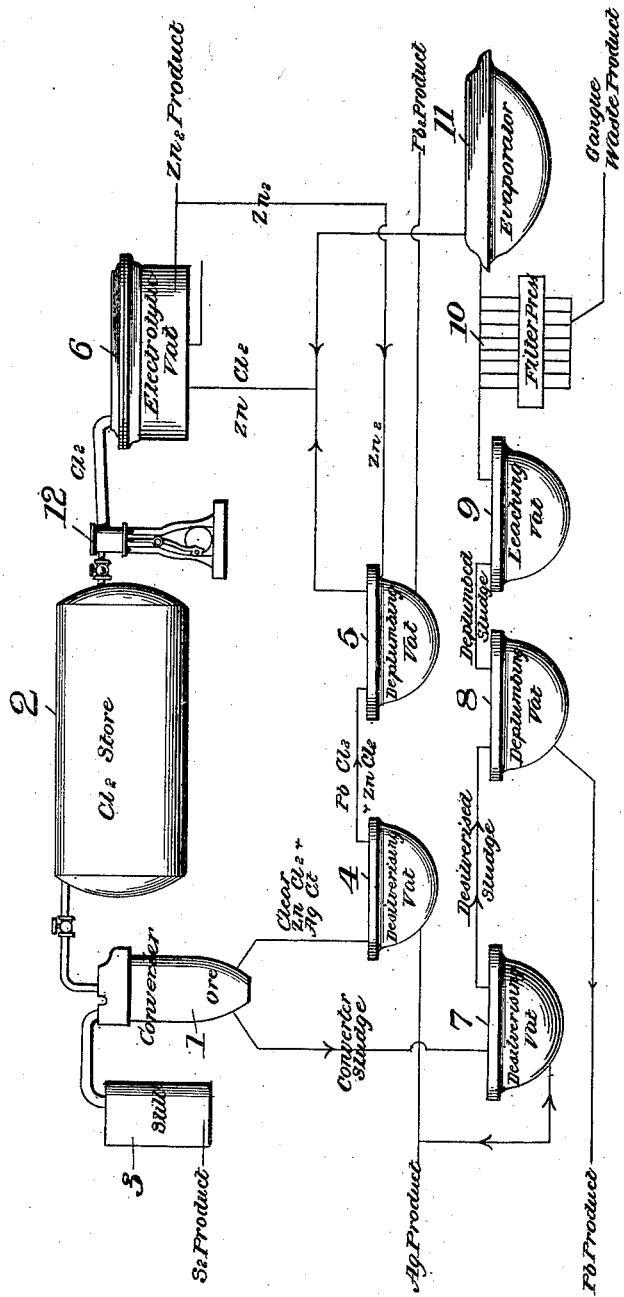
WITNESSES:
L. C. Hills
Walter Allen
INVENTORS:
James Swinburne
Edgar Arthur Ashcroft.
BY Knight Bros Attorneys.

UNITED STATES PATENT OFFICE.

JAMES SWINBURNE AND EDGAR ARTHUR ASHCROFT, OF LONDON, ENGLAND.

PROCESS OF EXTRACTING METALS FROM SULFID ORES.

SPECIFICATION forming part of Letters Patent No. 695,126, dated March 11, 1902.

Application filed December 8, 1899. Serial No. 739,683. (No specimens.)

*To all whom it may concern:*

Be it known that we, JAMES SWINBURNE and EDGAR ARTHUR ASHCROFT, subjects of the King of England, residing at London, England, have invented a certain new and useful Process of Extracting Metals from Sulfid Ores by Treatment with Hot Chlorin and Electrolysis, (for which we have made application for Letters Patent in Great Britain, No. 14,278, dated July 11, 1899,) of which the following is a specification.

Our invention has reference to the treatment of sulfid ores with hot chlorin.

The process is applicable to the numerous sulfid ores in which the various metals are contained single or together; but we will describe it particularly in connection with mixed lead-zinc-silver-sulfid ores, which are otherwise notoriously difficult to treat.

The invention consists in treating the ground unroasted ore suspended in a bath of fused metallic haloid salts with chlorin, thus forming chlorids of the heavy metals of the ore and free sulfur and electrolyzing the chlorids so formed, so as to obtain the metals and recover the chlorin.

In carrying this invention into effect the ore is crushed and made into a semifluid or fused mass with fused chlorid of zinc or of lead or the mixed chlorids of zinc and of lead. The semifluid or fused mass in a chlorinator or suitable vessel is treated with chlorin, the gas being forced in at the bottom. At a suitable temperature, about 700° centigrade or higher, the chlorin is rapidly absorbed by the metals, and sulfur is given off in its place $2Ms + 2Cl_2 = 2MCl_2 + S_2$. The reaction is most vigorous at high temperatures, and being exothermic the temperature may be maintained and regulated by increasing or decreasing the blast of chlorin. If desired, the operation may be pushed so far as to more or less completely volatilize the zinc and the other metallic chlorids, leaving the gangue behind as a residue, associated only with small quantities of chlorids.

To start the operation, a small coke fire is started in the otherwise empty chlorinator. The chlorinator may be a large fire-clay or plumbago crucible with a hood to keep in the sulfur vapor and a passage to a condensing-chamber for separating the sulfur. The coke fire is blown by a nozzle or pipe with an air-blast. When it is burned away, the inside of the chlorinator is at a dull-red heat. A little zinc chlorid is melted separately in a ladle and run into the chlorinator, and a little ground sulfid ore is run into it. Chlorin is then blown in, and as the ore is decomposed more ore is run in until the chlorinator is as full as convenient. As the reaction produces fused chlorids of zinc, lead, iron, manganese, &c., the contents of the chlorinator remain sufficiently fluid. When the chlorinator is as full as convenient, the supply of sulfid ore is stopped. Enough chlorin is blown in to decompose all the sulfids present, and the major portion of the fluid contents are run off into another vessel with a corresponding share of gangue suspended in the mixture. Enough fused chlorin is left in the chlorinator to enable the chlorination to proceed again as more sulfid ore is added, and so on.

The iron which is practically always present may be all converted into the ferric state by chlorin before pouring off the fused chlorids, and in this state it is rapidly precipitated as $Fe_2O_3$ by the addition of ZnO (roasted zinc ore) to the chlorinator $$Fe_2Cl_6 + 3ZnO = Fe_2O_3 + 3ZnCl_2.$$

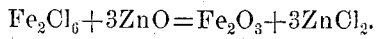

Manganese is also precipitated as oxid by passing in chlorin in the presence of zinc oxid $$2MnCl_2 + Cl_2 + 3ZnO = Mn_2O_3 + 3ZnCl_2,$$

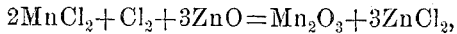

or manganese and iron are both precipitated by blowing in air in the presence of zinc oxid $$2FeCl_2 + O + 2ZnO = Fe_2O_3 + 2ZnCl_2.$$

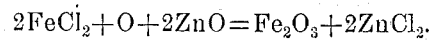

This zinc oxid may be made from the sulfid, if desired, by oxidizing a portion of the sulfur of the ore by means of the air-blast instead of carrying the decomposition of the sulfid to completion by means of the chlorin blast $$4FeCl_2 + 7O_2 + 4ZnS = 2FeO_3 + 4ZnCl_2 + 4SO_2.$$

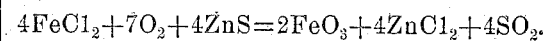

During nearly the whole of the process the chlorin is completely absorbed, sulfur being liberated. This is collected and condensed. Toward the end a little excess of chlorin may be necessary to make sure of oxidizing all the iron to the ferric state. Any chlorin that passes over at this stage may be returned to the chlorin store after condensation of the sulfur, taking care to avoid the formation of chlorid of sulfur by keeping the chlorin from coming into contact with the sulfur. The sulfur is comparatively pure and may be sold for any common purpose. If it is associated with important quantities of metallic chlorids, as will be the case when conducting the process at high temperatures, they are separated by fusing the sulfur and letting the mixture separate by gravity. At the end of the treatment the fluid discharged from the chlorinator consists of varying quantities of fused chlorids of zinc, lead, silver, iron, and manganese and all the gangue. If zinc oxid has been added to the charge, the iron and manganese are present as oxids, and the gangue and the iron and manganese oxids may be allowed to settle and the other chlorids poured off. The fused chlorids are then treated with metallic lead, which removes all the metals which will part with their chlorin to lead, such as silver and gold and antimony. The excess of lead, which is now rich in silver and in some cases gold, is then run off to be treated for the precious metals. The fused chlorids may then be treated with zinc, which takes out the lead by substitution. The fused mass then contains zinc chlorid and some traces of chlorids of iron and manganese and other metals. Instead of extracting the lead by substitution of zinc the mixed chlorids may be fractionally electrolyzed without previous treatment with lead or zinc, in which case the silver lead and the zinc will separate in turn and may be drawn off from the electrolysis bath at suitable intervals. Instead of precipitating the iron and manganese when the charge is fused the chlorids after the extraction of lead and precious metals may be dissolved in water and the solution treated for the removal of iron and manganese by means of zinc oxid or otherwise, the iron being brought to the ferric state by chlorin. The resulting solution of zinc chlorid is then evaporated down and fused and electrolyzed to extract the zinc. The double chlorids of sodium or potassium and zinc are preferred for electrolysis, because they decompose little on drying and are more fusible and conduct better. They also fume but little on melting and exposure to the air. As to the mixture of gangue and fused chlorids from which the clear chlorids have been poured or partially distilled off, the semifluid mass may be treated with lead and then with zinc in the same way as the clear chlorids. The zinc chlorid may be dissolved out in water, when some small globules of lead or zinc, which have been mixed with the gangue and which are easily separated under water, may be separated, or the chlorids may be distilled from the gangue by heating. The more or less pure product of zinc chlorid resulting from the above operations is conveniently treated by electrolysis in the fused state, the resulting zinc being collected as molten metal and the chlorin drawn off to be used for the chlorinators. The electrolysis is best carried on in a vat, which is heated and kept hot by the electric current, which causes the decomposition of the chlorid. The pressure necessary at the terminals of the bath will depend to a large extent on the means employed to conserve the heat in the bath.

The chlorin from the electrolysis-vat may be pumped direct to the chlorinator; but preferably it is cooled and compressed and stored in the liquid state. The storage may be assisted by cooling to a low temperature. This chlorinator method of treating sulfids with chlorin is applicable to the treatment of other sulfids, such as iron, copper, nickel, cobalt, antimony, &c.

In order that our invention may be fully understood, we will describe it with reference to the accompanying diagrammatic drawing, which shows the scheme of our process.

Tracing the progress of the ore, it is led into the chlorinator 1, where it is run by gravity into fused zinc chlorid, so as to form a semifluid or fused mass. The chlorinator is of fireclay, preferably glazed inside. If the chlorinator is not glazed inside, it is porous and soaks up some of the fused zinc chlorid. The chlorinator is self-heating, as the chemical action is fierce; but the vessel is not heated externally, and the outside is therefore below the temperature of fusion of zinc chlorid. The salt thus does not pass through the porous vessel entirely, but solidifies in the body of the wall of the chlorinator and renders it no longer porous.

Chlorin is blown in by a porcelain or fireclay pipe, with its end immersed in the semifluid mass, from the chlorin store 2, where it is under pressure. The sulfur formed is condensed in the still 3. The sulfur is subsequently fused to separate the chlorids that have been carried over with it and which settle out of the fused mass and is then a final product. At the final state of the conversion air is blown into the converter to precipitate iron and manganese as oxids. The air is blown into the converter by an ordinary air-blower and is supplied through the chlorin-pipe.

When the conversion of the sulfids into chlorids is complete, the charge in the chlorinator is run off and allowed to settle, and the clear chlorids of silver, lead, and zinc— that is, chlorids free from gangue with any chlorids of antimony or arsenic—are run into the desilverizing-vat 4, where the silver, antimony, and arsenic are taken out by substitution of lead $$4AgCl + 2Pb = 2PbCl_2 + 2Ag_2.$$

The rich silver bullion from this vat is a final product. The desilverized lead and zinc chlorids are led to the deplumbing-vat 5, when the lead is removed by zinc $$2PbCl_2 + Zn_2 = 2ZnCl_2 + Pb_2.$$

The lead is a final product, and the zinc chlorid goes to the electrolytic vat 6 still in the fused state. The other portion of the converter charge or sludge consists of gangue and iron and manganese oxids reduced to the consistence of mud by fused chlorids. This chlorinator mud is led to the desilverizing-vat 7 and then to the deplumbing-vat 8. The materials are maintained in a fused condition in the desilverizing, the plumbing, and the electrolysis vats. The desilverizing and deplumbing processes are quick enough to be carried out before the mass cools. The electrolysis-vat is kept hot by the electric current, as in the case of aluminium, but in the case of zinc chlorid a much smaller surplus electrical pressure is needed.

Desilverizing—$2AgCl + Pb = PbCl + Ag$.
Deplumbing—$2PbCl_2 + Zn_2 = 2ZnCl_2 + Pb_2$.

After that if the wet way is preferred it is cooled and led to the leaching-vat 9, where the chlorid of zinc is dissolved in water. It is separated from the gangue by the filter-press 10 and by further leaching, and the solution is mixed with the potassium chlorid and evaporated down and fused in the evaporator 11 and then led to the electrolytic vat 6. In this vat it is electrolyzed, yielding zinc and chlorin. The chlorin is compressed by the pump 12 into the store 2.

The pump 12 should have iron only exposed to the chlorin. The sulfuric acid arrangement by which the chlorin comes into contact only with strong acid well known in the industry may be employed to compress the chlorin. We have found, however, that where the chlorin is perfectly free from moisture, as it is in our process, the difficulties of dealing with it are very much reduced. We found a direct steam-pump with a piston-rod common to both cylinders unsuitable, as the piston-rod carried enough moisture into the chlorin-cylinder to give trouble. The store is an iron vessel capable of standing pressure. We have used an old egg-ended boiler with good results. The boiler is preferably previously tested, because the bursting of a boiler of compressed chlorin might disconcert the workman.

We find a practical difficulty in the arrangement precisely as shown. The electrolytic vat on a commercial scale is somewhat rough and cannot well be arranged to stand pressure either external or internal. The result is that if the pump works a little too fast it draws air in through the vat, while if it works too slow chlorin leaks out through various crevices in the vat, and though dry chlorin seems to have much less effect on the lungs than chlorin from the Weldon process or aqueous electrolysis it is very difficult to keep it from corroding the copper parts of the dynamo. We therefore arrange the pump to take somewhat less than the whole of the chlorin, and the surplus is led into contact with hot sulfur, forming chlorid of sulfur. There is thus neither back pressure nor partial vacuum in the vat. The chlorid of sulfur is used in the converter, or another method which we prefer is to let the pump draw a little air in with the chlorin. A little air does no harm in the chlorinator. In fact, it is sometimes wanted where the iron is to be thrown out as ferric oxid.

What we claim as our invention, and desire to secure by Letters Patent, is—

1. The herein-described process, consisting in treating sulfid ores, suspended in a bath of fused chlorid or chlorids, with chlorin, substantially as described.

2. The hereinbefore-described process consisting in treating sulfid ores by passing chlorin through a bath of the ore and a fused chlorid thereby producing free sulfur, the chlorin combining with the metals of the ore.

In testimony whereof we have signed our names to this specification in the presence of two subscribing witnesses.

JAMES SWINBURNE.
EDGAR ARTHUR ASHCROFT.

Witnesses:
E. E. SKINNER,
V. HIPWELL.